United States Patent [19]
Ebe

[11] Patent Number: 5,913,089
[45] Date of Patent: Jun. 15, 1999

[54] CAMERA

[75] Inventor: Akihiko Ebe, Yokohama, Japan

[73] Assignee: Canon Kabushiki Kaisha, Tokyo, Japan

[21] Appl. No.: 08/918,212

[22] Filed: Aug. 25, 1997

[30] Foreign Application Priority Data

Aug. 29, 1996 [JP] Japan .................................. 8-228230

[51] Int. Cl.⁶ ............................................. G03B 17/02
[52] U.S. Cl. ............................................................ 396/448
[58] Field of Search .................................. 396/348, 349, 396/448, 535, 176

[56] References Cited

U.S. PATENT DOCUMENTS

| | | | |
|---|---|---|---|
| 2,495,223 | 1/1950 | Bodlander | 396/448 |
| 4,171,894 | 10/1979 | Yamada | 396/448 |
| 4,283,132 | 8/1981 | Engelsmann et al. | 396/448 |
| 4,367,028 | 1/1983 | Tomatsuri et al. | 396/448 |
| 4,522,478 | 6/1985 | Kando et al. | 396/448 |
| 5,594,523 | 1/1997 | Fujisaki | 396/448 |
| 5,608,478 | 3/1997 | Kamoda | 396/448 |

*Primary Examiner*—Alan A. Mathews
*Attorney, Agent, or Firm*—Robin, Blecker & Daley

[57] ABSTRACT

A camera includes a first protection cover movable for opening and closing along a camera body, and a second protection cover movable for opening and closing along the camera body, wherein the second protection cover overlaps with the first protection cover when the second protection cover moves for opening.

19 Claims, 4 Drawing Sheets

CAMERA

BACKGROUND OF THE INVENTION

1. Field of the Invention

The present invention relates to a camera, and more particularly to an improvement of a protection cover device which protects a lens barrel, a viewfinder window, an AF (automatic focusing) window, etc., provided at a front face portion of the camera.

2. Description of Related Art

In a barrier device of a camera serving as a protection cover device which protects a lens barrel, a viewfinder window, an AF window, etc., provided at a front face portion of the camera, there have heretofore been proposed a sliding type in which a barrier body disposed at a front surface of the camera body to cover the lens barrel, etc., is arranged to be moved in lengthwise directions (rightward and leftward) with respect to the camera body, and a flip-up type in which the barrier body is arranged to be swung via a hinge member around a pivot axis which extends in a direction perpendicular to an optical axis of the lens barrel. In the above two types of barrier devices, it is general that the barrier body has a one-piece structure and, therefore, performs opening and closing operations integrally.

Further, there is also known a barrier device of the type in which the barrier body has a two-piece structure including a larger cover and a smaller cover and, as the larger cover is slid for opening or closing, the smaller cover is raised or lowered in a direction (optical axis direction) perpendicular to the sliding direction of the larger cover, as disclosed in Japanese Utility Model Publication No. Sho 61-2983.

However, the prior-proposed barrier devices of the kind having a one-piece barrier body have the following shortcomings.

First, in respect of the size of the barrier body, the photo-taking lens barrel, the viewfinder window, the AF window, etc., must be disposed at respective positions which can be covered and protected by the barrier body when the barrier body is closed, so that a great limitation would be imposed on the location of the various parts disposed on a front face of the camera.

Secondly, since the barrier device must be arranged to prevent light incident on or exiting from the photo-taking lens barrel, the viewfinder window, the AF window, or the like, from being eclipsed by the barrier body during the photo-taking operation, it is inevitable in the case of the barrier device of the sliding type that the amount of movement of the barrier body becomes large to cause the barrier body to protrude from an edge of the camera body when the barrier body is opened. Such a protruding state of the barrier body degrades the portability of the camera during the photo-taking operation, and the barrier device would be damaged if external force is applied to the barrier body.

Thirdly, the lateral size of the camera body must be increased in order to avoid the state of the barrier body protruding from an edge of the camera body.

In the case of the barrier device having a two-piece barrier body, as disclosed in Japanese Utility Model Publication No. Sho 61-2983, the smaller cover takes a raised position during the photo-taking operation. Therefore, in order to prevent light incident on or exiting from the photo-taking lens barrel, the viewfinder window, the AF window, or the like from being eclipsed, the height of the raised smaller cover must be limited and distances from the raised smaller cover to the AF window, the viewfinder window and the photo-taking lens barrel must be sufficiently long. In addition, the raised state of the smaller cover degrades the portability of the camera during the photo-taking operation.

BRIEF SUMMARY OF THE INVENTION

In accordance with one aspect of the invention, there is provided a camera which comprises a first protection cover movable for opening and closing along a camera body, and a second protection cover movable for opening and closing along the camera body, wherein the second protection cover overlaps with the first protection cover when the second protection cover moves for opening, so that a protecting area of the protection covers can be broadened without increasing the size of the camera and without degrading the operability thereof.

The above and other aspects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

FIGS. 1, 2, 3 and 4 show a barrier device in a camera arranged according to the invention as a first embodiment thereof.

Figure 1:
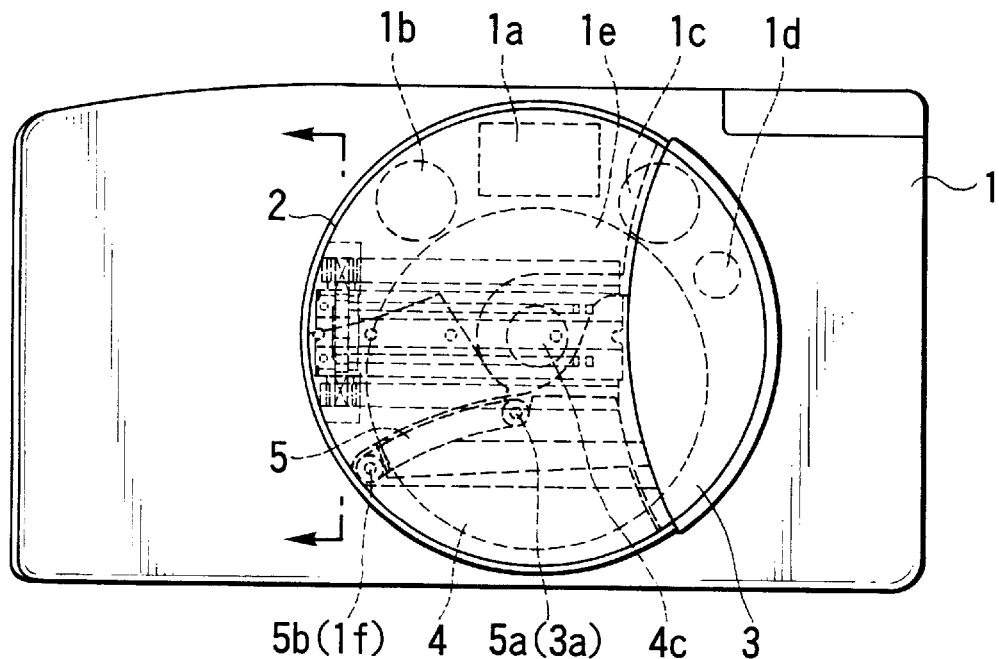
FIG. 1 is a plan view showing a barrier device in a closed position in a camera according to a first embodiment of the invention.
Figure 2:
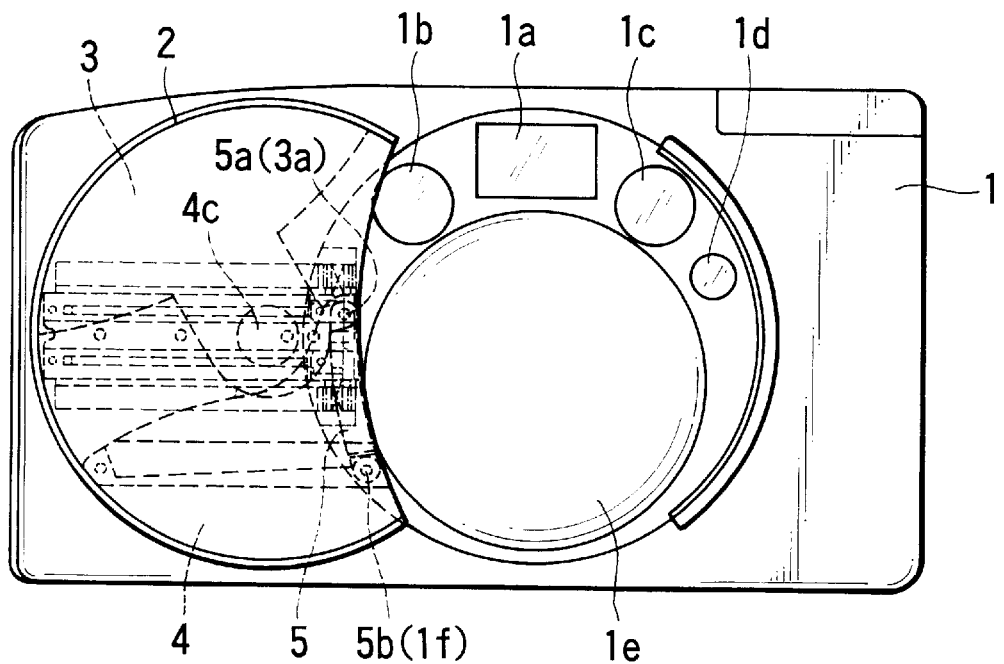
FIG. 2 is a plan view showing the barrier device in an open position in the camera according to the first embodiment of the invention.
Figure 3:
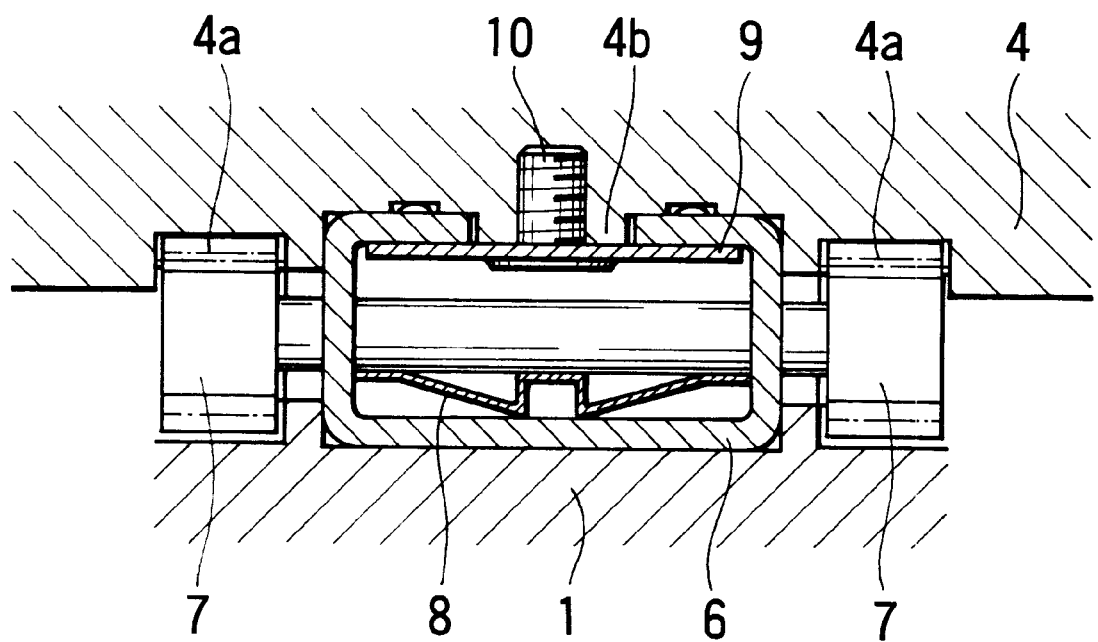
FIG. 3 is a sectional view showing a gear portion arranged to slidingly guide a main barrier shown in FIG. 1.
Figure 4:
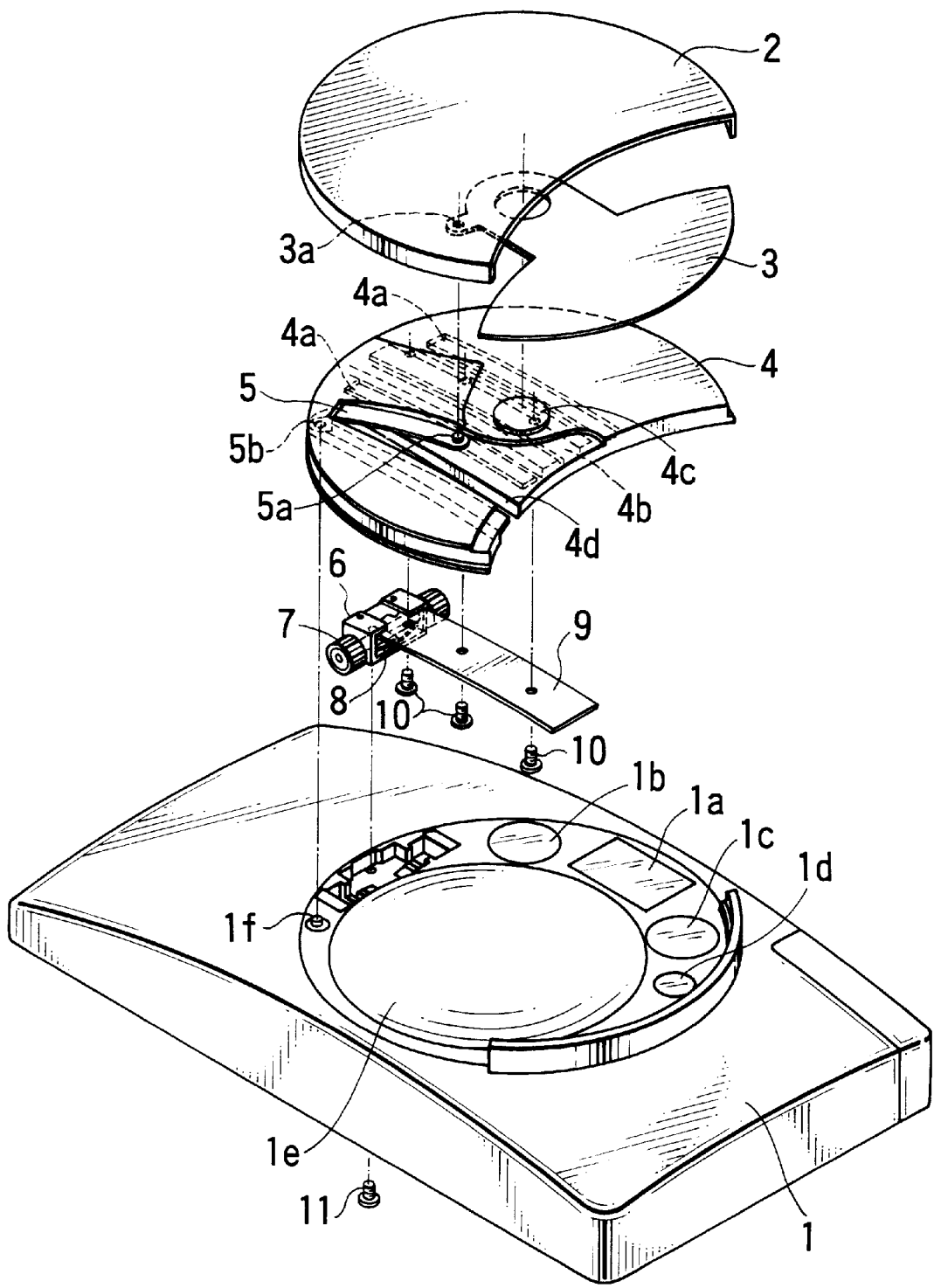
FIG. 4 is an exploded perspective view showing the barrier device in the camera according to the first embodiment of the invention.

FIG. 1 shows the barrier device in a closed position. FIGS. 2 shows the barrier device in an open position. FIG. 3 shows in a sectional view a gear portion arranged to-slidingly guide a main barrier. FIG. 4 shows in an exploded perspective view the arrangement of the barrier device.

Referring to FIGS. 1 to 4, reference numeral 1 denotes a camera body, reference numeral 2 denotes a main-barrier cover, reference numeral 3 denotes a sub-barrier, reference numeral 4 denotes a main barrier, and reference numeral 5 denotes a barrier driving lever.

A viewfinder part 1a, AF light projecting and receiving parts 1b and 1c, a light measuring part 1d and a photo-taking lens barrel part 1e are disposed on the front side of the camera body 1. The viewfinder part 1a, the AF light projecting and receiving parts 1b and 1c, the light measuring part 1d and the photo-taking lens barrel part 1e are arranged to be covered and protected and to be opened to the outside by sliding and rotating actions of barrier members including the main-barrier cover 2, the sub-barrier 3 and the main barrier 4.

The main barrier 4 and the main-barrier cover 2 are formed in almost the same planar shape. The sub-barrier 3 is arranged to be stowable within a clearance provided between the main barrier 4 and the main-barrier cover 2. The main barrier 4 is formed in the planar shape having an arcuate cutout part, in which an arcuate part is cut out from a circular planar shape. The sub-barrier 3 is in a planar convex shape having two arcuate sides curved to coincide with the shape of the cutout part of the main barrier 4.

A protruding guide part 4b convex toward the camera body 1 is formed on the reverse side of the main barrier 4 in such a way as to extend in the right and left directions with respect to the camera body 1. A barrier rail plate 9 is fixed to the protruding guide part 4b with screws 10. A barrier rail 6, which is fixed to the camera body 1 with a screw 11, is slidably fitted on the barrier rail plate 9 fixed to the main barrier 4.

Accordingly, the main barrier 4 is arranged to be slidable in the right and left directions (in lengthwise directions) with respect to the camera body 1. Further, slide gears 7 which are rotatably supported by the barrier rail 6 are in mesh with internal gear parts 4a provided on the reverse side of the main barrier 4, so that rattling caused by the sliding action of the main barrier 4 can be lessened. A slide-gear pressing spring 8, which is attached to the barrier rail 6, is arranged to push the shaft part of the slide gears 7 so as to minimize any meshing backlash of gears.

The sub-barrier 3 is disposed in such a way as to cover the cutout part on one side of the main barrier 4, and is arranged to rotate around a fitting engagement shaft part 4c provided on the main barrier 4 so that the sub-barrier 3 can be retracted into the above-stated clearance between the main barrier 4 and the main-barrier cover 2.

A shaft hole 3a is formed in an arm part of the sub-barrier 3 adjacent to the center of rotation of the sub-barrier 3. A shaft part 5a formed at one end part of the barrier driving lever 5 is fitted in the shaft hole 3a of the sub-barrier 3. A shaft hole 5b formed in another end part of the barrier driving lever 5 is fitted on a shaft part if formed on the camera body 1. The barrier driving lever 5 extends toward the camera body 1 through a slit part 4d which is formed by cutting out a part of the main barrier 4.

Accordingly, the barrier driving lever 5 is rotated around the shaft part if of the camera body 1 in association with a sliding action of the main barrier 4. Then, the sub-barrier 3, which is translated together with the main barrier 4 with respect to the camera body 1, makes such a rotating motion that the shaft hole 3a provided in the sub-barrier 3 orbits on an intersection point where the locus of rotation of the barrier driving lever 5 around the shaft part if of the camera body 1 intersects the locus of rotation of the sub-barrier 3 around the fitting engagement shaft part 4c of the main barrier 4.

The main-barrier cover 2 is mounted on and fixed to the main barrier 4 with the above-stated clearance formed between them in such a way as to allow the sub-barrier 3 and the barrier driving lever 5 to rotate there without hindrance.

According to the first embodiment, the sub-barrier 3 is rotated in accordance with the opening or closing sliding action of the main-barrier cover 2, i.e., the main barrier 4. When the barrier device is in a closed state, the viewfinder part 1a, the AF light projecting and receiving lens parts 1b and 1c, the light measuring part 1d and the photo-taking lens barrel part 1e which are disposed on the camera body 1 are covered by the main-barrier cover 2 (the main barrier 4) and the sub-barrier 3, which jointly form a barrier area of an approximately planar circular shape.

When the barrier device is in an open state, the sub-barrier 3 is stowed behind the main-barrier cover 2 by being rotated. Therefore, the viewfinder part 1a, the AF light projecting and receiving parts 1b and 1c, the light measuring part 1d and the photo-taking lens barrel part 1e are made open to the outside, including the cutout part of an arcuate shape formed by retracting the sub-barrier 3, without causing the end part of the main barrier 4 as well as the main-barrier cover 2 to protrude from an edge of the camera body 1.

Figure 5:
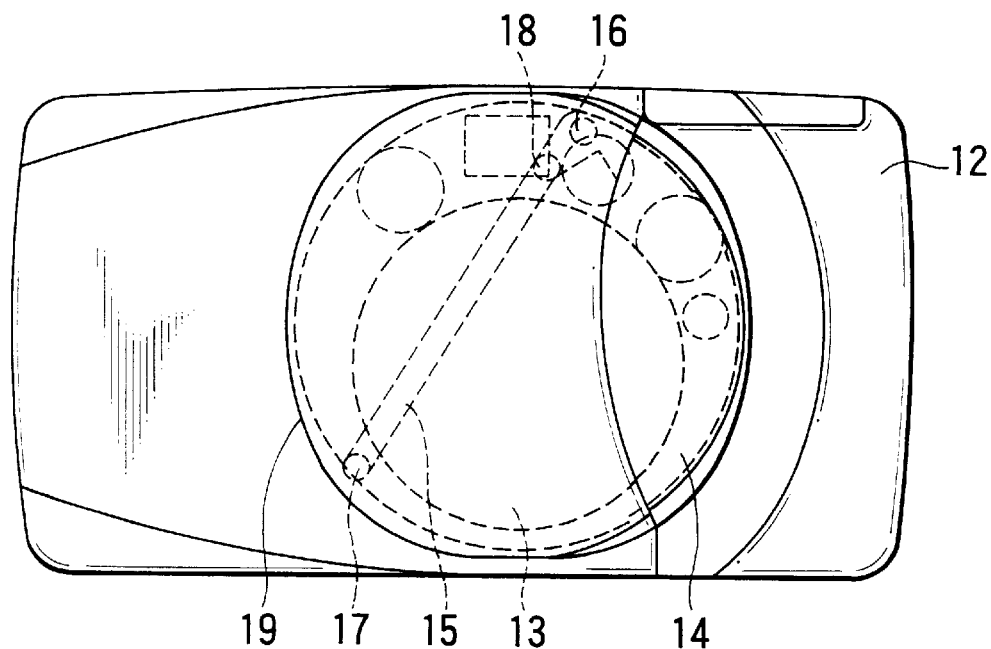
FIG. 5 is a plan view showing a barrier device in a closed position in a camera according to a second embodiment of the invention.
Figure 6:
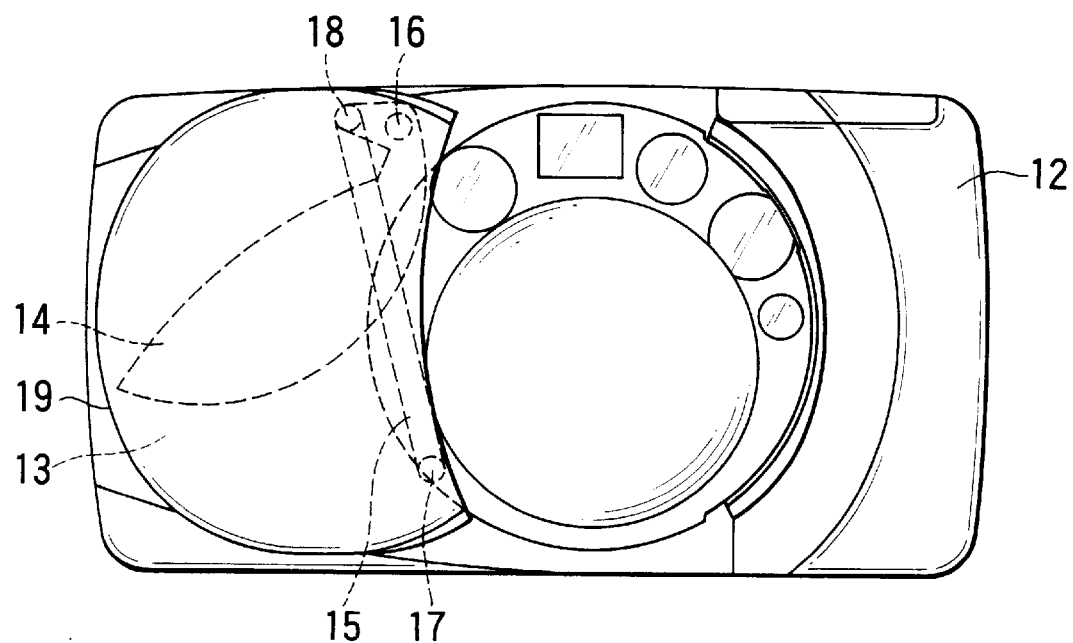
FIG. 6 is a plan view showing the barrier device in an open position in the camera according to the second embodiment of the invention.

FIGS. 5 and 6 show a barrier device of a camera arranged as a second embodiment of the invention.

The fundamental arrangement of the second embodiment is the same as that of the first embodiment shown in FIGS. 1 to 4. However, the second embodiment differs from the first embodiment in that the rotating direction of a sub-barrier 14 in the second embodiment is opposite to that of the sub-barrier 3 in the first embodiment.

FIG. 5 shows the barrier device in a closed state and FIG. 6 shows the barrier device in an open state. Referring to FIGS. 5 and 6, reference numeral 12 denotes a camera body, reference numeral 13 denotes a main barrier, reference numeral 14 denotes a sub-barrier arranged to rotate around a shaft part 16 of the main barrier 13, reference numeral 15 denotes a barrier driving lever 15 arranged to rotate around a shaft part 17 of the camera body 12 and coupled to the sub-barrier 14 by a shaft part 18, and reference numeral 19 denotes a main-barrier cover. In the case of the second embodiment, the sub-barrier 14 is arranged to rotate clockwise in accordance with a sliding action of the main barrier 13 in the direction of opening.

The direction and amount of a rotating motion are variable by varying the position of the center of rotation of the barrier driving lever relative to the camera body, the position of the center of rotation of the sub-barrier relative to the main barrier, the length of the barrier driving lever and an arm length from the center of rotation of the sub-barrier to the pivotal point of the barrier driving lever.

As described above, according to the arrangement of each of the embodiments, the main barrier and the sub-barrier jointly cover and protect the lens barrel, the viewfinder window, etc., of the camera body when the barrier device is in a closed position. Therefore, the positions of the lens barrel, the viewfinder window, etc., can be set under a less amount of restriction and with a greater design latitude.

Further, since, when the barrier device is in an open position, the sub-barrier is arranged to be stowed behind the main-barrier cover by being rotated, the sliding stroke of the main barrier for opening can be lessened. As a result, the barrier members can be arranged not to protrude from an edge of the camera body. Further, it is possible to reduce the lateral size of the camera body.

The individual components shown in schematic or block form in the drawings are all well-known in the camera arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in accordance with the invention, the methods of moving the main barrier and the sub-barrier are not limited to the methods disclosed but may be moved in various different manners as desired. The sliding motion may be changed to a rotating motion, and the rotating motion may be changed to a sliding motion.

Further, the invention is not limited to the manner in which the main barrier and the sub-barrier are interlocked with each other as in the case of embodiments disclosed above. The interlocking arrangement may be made in any of other suitable manners. The invention also applies to a barrier device wherein a main barrier and a sub-barrier are not interlocked with each other.

The invention may be carried out by combining as necessary the embodiments or their technological elements described in the foregoing.

The invention applies to cases where either the whole or a part of claims or the arrangement of each embodiment disclosed forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

I claim:

1. A camera comprising:
   (A) a first protection cover movable for opening and closing a first part of an optical surface of a camera body; and
   (B) a second protection cover movable in plural directions during at least one of opening and closing a second part of said optical surface of said camera body, said second protection cover overlapping with said first protection cover when said second protection cover moves for opening said second part of said optical surface.

2. A camera according to claim 1, wherein said second protection cover is arranged to cancel overlapping with said first protection cover when said second protection cover moves for closing and, then, together with said first protection cover, cover said first and second parts of said optical surface of said camera.

3. A camera according to claim 1, wherein said first protection cover is arranged to be slidable with respect to said camera body.

4. A camera according to claim 1, wherein said first protection cover is arranged to be slidable in lengthwise directions with respect to said camera body.

5. A camera according to claim 1, wherein said second protection cover is movably coupled to said first protection cover.

6. A camera according to claim 1, wherein said second protection cover is rotatably coupled to said first protection cover.

7. A camera according to claim 6, further comprising:
   a coupling device which couples said second protection cover to said camera body relatively movably.

8. A camera according to claim 1, wherein said second protection cover is movably coupled to said camera body.

9. A camera according to claim 1, wherein said second protection cover is rotatably coupled to said camera body.

10. A camera according to claim 1, wherein said second protection cover is arranged to move for opening and closing in association with opening and closing movement of said first protection cover.

11. A camera according to claim 1, wherein said second protection cover is arranged to move together with said first protection cover and, at the same time, relatively move with respect to said first protection cover.

12. A camera according to claim 11, further comprising:
   a coupling device which couples said second protection cover to said camera body relatively movably.

13. A camera according to claim 1, wherein said second protection cover moves together with said first protection cover and is rotatably coupled to said first protection cover.

14. A camera according to claim 13, further comprising:
   a coupling device which couples said second protection cover to said camera body relatively movably.

15. A camera according to claim 1, wherein said first protection cover is arranged to be located, when having moved for opening, at a position not extending beyond an edge of said camera body.

16. A camera according to claim 1, wherein said second protection cover is arranged to enter an inside of said first protection cover when said second protection cover moves for opening.

17. A protection cover apparatus for a camera, comprising:
   (A) a first protection cover movable for opening and closing a first part of an optical surface of a camera body;
   (B) a second protection cover movable in plural directions during at least one of opening and closing a second part of said optical surface of said camera body, said second protection cover overlapping with said first protection cover when said second protection cover moves for opening said second part of said optical surface.

18. An apparatus comprising:
   (A) a first protection cover movable for opening and closing a first part of an optical surface of a camera body; and
   (B) a second protection cover movable in plural directions during at least one of opening and closing a second part of said optical surface of said camera body, said second protection cover overlapping with said first protection cover when said second protection cover moves for opening said second part of said optical surface.

19. A protection cover device for an apparatus, comprising:
   (A) a first protection cover movable for opening and closing a first part of an optical surface of a camera body; and
   (B) a second protection cover movable in plural directions during at least one of opening and closing a second part of said optical surface of said camera body, said second protection cover overlapping with said first protection cover when said second protection cover moves for opening said second part of said optical surface.

* * * * *

UNITED STATES PATENT AND TRADEMARK OFFICE
CERTIFICATE OF CORRECTION

PATENT NO. : 5,913,089
DATED : June 15, 1999
INVENTOR(S) : Akihiko Ebe

It is certified that error appears in the above-identified patent and that said Letters Patent is hereby corrected as shown below:

Col. 2, line 54, delete "to-slidingly" and insert -- to slidingly --.
Col. 3, line 44, delete "part if" and insert -- part 1f --.
Col. 3, line 49, delete "part if" and insert -- part 1f --.
Col. 3, line 55, delete "part if" and insert -- part 1f --.

Signed and Sealed this

Twelfth Day of September, 2000

*Attest:*

Q. TODD DICKINSON

*Attesting Officer*  *Director of Patents and Trademarks*